United States Patent [19]

Balken et al.

[11] Patent Number: 4,571,099
[45] Date of Patent: Feb. 18, 1986

[54] BEARING ASSEMBLY FOR WHEEL HUB DRIVEN BY A UNIVERSAL JOINT

[75] Inventors: Jochen Balken, Neunkirchen; Werner Krude, Siegburg, both of Fed. Rep. of Germany; Michel A. Orain, Conflans-Sainte-Honorine, France

[73] Assignee: Uni-Cardan Aktiengesellschaft, Siegburg, Fed. Rep. of Germany

[21] Appl. No.: 544,596

[22] Filed: Oct. 24, 1983

[30] Foreign Application Priority Data

Oct. 22, 1982 [DE] Fed. Rep. of Germany ....... 3239121

[51] Int. Cl.⁴ .................. F16C 33/58; F16C 33/60; F16C 43/04
[52] U.S. Cl. .................................. 384/513; 384/501; 384/544
[58] Field of Search .................. 384/499–506, 384/510, 537–540, 544, 570

[56] References Cited

U.S. PATENT DOCUMENTS

| | | | |
|---|---|---|---|
| 1,233,476 | 7/1917 | Hughes | 384/501 |
| 1,505,352 | 8/1924 | Knowles | 384/501 |
| 1,908,474 | 5/1933 | Dewees | 384/501 |
| 3,583,511 | 6/1971 | Asberg | 384/544 X |
| 4,433,877 | 2/1984 | Colanzi | 384/544 |
| 4,440,256 | 4/1984 | Palmer | 384/544 X |

Primary Examiner—Stuart S. Levy
Assistant Examiner—Thomas R. Hannon
Attorney, Agent, or Firm—Toren, McGeady, Stanger, Goldberg & Kiel

[57] ABSTRACT

A bearing assembly for a wheel hub driven from a universal joint including an outer race attached to the wheel carrier of a motor vehicle having first and second outer bearing tracks thereon and an inner race having first and second inner bearing tracks thereon, the first bearing tracks being formed by a tubular projection of the universal joint and the second bearing tracks being formed by a tubular projection of the wheel hub. First and second bearing elements are interposed respectively betwen the first inner and outer tracks and the second inner and outer tracks and a sleeve extending within inner juxtaposed surfaces formed by the first and second tubular projections operates to place the universal joint in torque-transmitting engagement with the wheel hub and to restrain the tubular projections against relative axial displacement.

3 Claims, 1 Drawing Figure

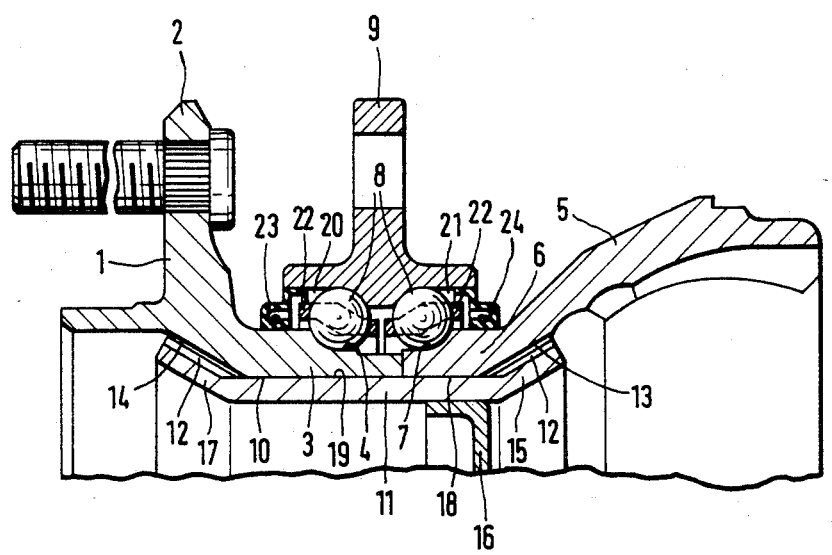

BEARING ASSEMBLY FOR WHEEL HUB DRIVEN BY A UNIVERSAL JOINT

The present invention relates generally to a bearing assembly for the wheels of an automotive vehicle and more particularly to an axial and radial load bearing assembly for a wheel hub which is driven from a rotary constant velocity universal joint.

Bearing assemblies of the type to which the present invention relates are provided at a respective wheel carrier of a motor vehicle and comprise a double-row bearing whose outer race is designed to be affixed to the wheel carrier and an inner race having a pair of running tracks, one of which is associated with the output part of the rotary constant velocity joint and the other of which is associated with the wheel hub.

With a design of this type, it has been proposed to arrange one of the inner running tracks of the bearing on the outer circumferential face of the outer part of the rotary constant velocity joint. In such cases, the outer part is provided with a tubular projection whose outer face engages internally in the tubular projection of the wheel hub. The projections are welded together, as disclosed in British Pat. No. 1 298 552, and it has been found that the disadvantage of this type of structure is the relatively large diameter and consequently the relatively heavy weight resulting from the mounting of the bearing assembly externally of the outer member of the universal joint. The bearing diameter is greater than that normally required for this type of application. Connecting the two tubular projections by welding requires a relatively expensive welding process, e.g., electron beam welding, in order to avoid adverse effects on lateral running due to distortion.

It has also been proposed to provide the outside of a tubular projection connected to the wheel hub with external axially extending teeth and for a tubular projection on the outer part of the universal joint to be provided internally with corresponding axially extending teeth to be received in the outer teeth, the two tubular extensions being secured to each other in the axial direction by caulking. Such a structure is disclosed in German Auslegeschrift No. 1 915 932.

A proposal such as this permits the diameter of the bearing and thus its weight to be reduced. However, the mutual connection by means of axially extending teeth results in considerable disadvantages. Axial toothing does not permit accurate centering of the wheel hub and the joint relative to each other. This adversely affects the quality of the bearing with regard to concentric operation. Furthermore, axial teeth are not suited to prevent rotary play. Axial securing of the wheel hub and the joint does not operate to prevent this. Additionally, the formation or production of such teeth is complicated and expensive and the teeth require a relatively great guiding length of the projections.

The present invention is therefore directed to providing a bearing assembly wherein both the outer part of the universal joint and the wheel hub may be produced in a simpler manner which permits accurate centering of the parts relative to each other and consequent accurate concentric operation and which will ensure a compact design with respect to the bearing diameter.

SUMMARY OF THE INVENTION

Briefly, the present invention may be described as a bearing assembly for a wheel hub driven from a universal joint especially suitable for use in a motor vehicle comprising outer race means adapted for attachment to wheel carrier means of the motor vehicle, said outer race means having first and second outer bearing tracks formed therein, inner race means having first and second inner bearing tracks thereon arranged substantially coaxial with said first and second outer tracks, first bearing elements in bearing engagement between said first inner and said first outer bearing tracks, second bearing elements in bearing engagement between said second inner and said second outer bearing tracks, a first tubular projection extending from said universal joint having said first inner bearing tracks thereon, a second tubular projection extending from said wheel hub having said second inner bearing tracks thereon, said first and said second tubular projections having juxtaposed inner cylindrical surfaces, and sleeve means fitted to extend within said juxtaposed inner cylindrical surfaces for connecting said wheel hub and said inner joint in torque-transmitting engagement, said sleeve means and said first and second tubular projections including cooperating formations for securing said tubular against relative axial displacement.

Thus, in accordance with the invention, the first and second tubular projections may have their juxtaposed inner cylindrical surfaces arranged to define a bore by means of which the first and second projections may be received on the sleeve means so as to enable centering thereof with the sleeve additionally acting to firmly connect the driven part of the wheel hub for rotation and for axial affixation thereof.

The advantage of a design in accordance with the present invention is that the sleeve means ensures accurate centering of the universal joint and of the wheel hub and of the running tracks of the bearing relative to each other. Furthermore, the centering lengths of the tubular projections may be relatively short which has a positive effect on the axial length of the bearing and on the weight thereof.

In accordance with a further important feature of the invention, the sleeve means is formed with teeth adapted to engage in corresponding teeth arranged in the portions of the wheel hub and the universal joint where the first and second tubular projections are located. Thus, the sleeve means through the engaging teeth may operate as an interconnecting member between the universal joint and the wheel hub. By providing this connection, particularly with the interengaging teeth formed with a conical configuration, it is possible to prevent play both in the circumferential and in the axial directions. In addition, as a result of the manner in which the teeth are connected, the teeth need not be produced in the universal joint and in the wheel hub by separate processes, but may instead be produced by precision forming at the same time as other contours of the respective parts are formed. For example, the teeth arranged in the member of the universal joint may be accessible at the same end of this member as are the tracks of the joint. Additionally, the diameter of the bearing may be further reduced because the teeth are provided in a region, at the ends of the sleeve means, where the diameter of the bearing does not need to be increased to accommodate the presence of teeth and where there is a sufficiently large amount of material available on the sleeve means and on the tubular extension to accommodate the teeth.

Furthermore, in accordance with a further feature of the invention, at least one of the tooth ends may be connected to the counterteeth by deformation after assembly of the wheel hub and of the output member of the rotary constant velocity universal joint. Deformation has the advantage that it avoids play in the circumferential and axial directions and that, in addition, by avoiding welding, it precludes any deformation which may occur due to thermal effects. Advantages also arise from the point of view of safety because the connection is permanent and it is impossible for the bearing to become disassembled, which would not be the case if the connection were to be effected by bolts, for example. One end of the sleeve means may be preformed, i.e., it may be expanded so as to be conical, so that after assembly only the other end needs to be expanded.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DESCRIPTION OF THE DRAWING

The single FIGURE of drawing is a sectional view showing a bearing assembly in accordance with the present invention.

DETAILED DESCRIPTION OF THE PREFERRED EMBLDIMENT

Referring now to the drawing, there is shown a bearing assembly wherein a part of a wheel hub 1 is formed with a flange 2 for enabling a wheel to be affixed thereto. Additionally, the wheel hub 1 includes a projection 3 which is formed with a bore 10 on the inner side thereof and with a groove 4 on the outer side thereof, the groove 4 forming an inner running track or race of a double-track bearing of the assembly of the invention.

The assembly includes a universal joint which includes an outer joint member 5 formed with a tubular projection 6 having an inner bore 18 and having a groove 7 on the outer surface thereof which defines another inner running track or race of the double-track bearing of the assembly of the invention.

The bearing assembly includes an outer race member 9 adapted to be connected to wheel carrier means, the outer race means 9 having formed therein a pair of grooves 20 and 21 which act respectively as the outer running tracks or races of the double-track bearing of the assembly of the invention.

Rolling members or balls 8 are interposed between the grooves 4 and 20 and between the grooves 7 and 21 thereby forming the double-track bearing previously mentioned.

The outer joint member 5 is formed on the inner side thereof with a conically extended area adjacent the bore 18 which has formed thereon inner teeth 13. A similar conically extending area is formed on the wheel hub 1 adjacent the bore 10 which also includes teeth 14.

The cylindrical bores 18 and 10 are arranged juxtaposed to form a generally cylindrical bore within which a sleeve 11 is provided having an outer cylindrical face 19 adapted to receive the cylindrical bores 18 and 10 in order to center the outer joint member 5 with the wheel hub 1.

The sleeve 11 is formed with a pair of ends 15 and 17 which are provided with teeth 12 adapted to engage the teeth 13 and 14 of the joint member 5 and of the wheel hub 1, respectively. After assembly of the wheel hub 1 and the outer joint member or output part 5, the ends 15, 17 are extended. As a result, the teeth 12, 13, 14 engage into each other and due to the deformation, they connnect, in a manner free of clearance, the wheel hub 1 and the output part 5 axially and in the direction of rotation for the purpose of transmitting torque.

As previously indicated, the outer race 9 is provided with grooves 20, 21 within which the rolling members 8 are engaged. The outer race 9 includes suitable means for affixing the outer race to the wheel carrier of the motor vehicle. The rolling members 8 are held by cages 22 and the double-track bearing is sealed by seals 23, 24. On the side of the outer joint member 5, the sleeve 11 is provided with a sealing cap 16 which is inserted into the interior of the sleeve.

Thus, from the foregoing, it will be seen that the invention relates to a bearing assembly of a driven wheel hub of a motor vehicle wherein the mutual centering of the wheel hub and of the driving rotary constant velocity universal joint is improved in the case of a unit composed of separate parts while simultaneously reducing the dimensions and weight of the assembly.

The centering function is undertaken by a separate component, i.e., the sleeve 11, which additionally serves to connect the wheel hub and the output part which is constituted by the outer joint member 5 of the rotary constant velocity universal joint for driving the wheel hub in the direction of rotation and to restrain relative axial movement.

It will be clear that the assmebly procedure is greatly simplified in that the sleeve 11 is first inserted into the bores 10 and 18 formed by the tubular projections 3 and 6. After the tubular projections 3 and 6 have been engaged about the sleeve 11, the ends 15 and 17 of the sleeve 11 are deformed or flared outwardly until the teeth 12 engage into the teeth 13 and 14, respectively, of the outer joint member 5 and of the wheel hub 1. Thus, the sleeve 11 operates not only to ensure torque-transmitting engagement between the wheel hub 1 and the outer joint member 5, but it also prevents axial relative displacement therebetween.

While a specific embodiment of the invention has been shown and described in detail to illustrate the application of the inventive principles, it will be understood that the invention may be embodied otherwise without departing from such principles.

What is claimed is:

1. A bearing assembly for a wheel hub driven from a universal joint especially suitable for use in a motor vehicle comprising: outer race means adapted for attachment to wheel carrier means of said motor vehicle, said outer race means having first and second outer bearing tracks formed therein; inner race means having first and second inner bearing tracks thereon arranged substantially coaxially with said first and second outer bearing tracks; first bearing elements in bearing engagement between said first inner and said first outer bearing tracks; second bearing elements in bearing engagement between said second inner and said second outer bearing tracks; a first tubular projection extending from said universal joint having said first inner bearing tracks thereon; a second tubular projection extending from said wheel hub having said second bearing tracks thereon; a second tubular projection extending from said wheel hub having said second bearing tracks thereon; said first and said second tubular projections having juxtaposed inner cylindrical surfaces; sleeve means comprising a generally cylindrically shaped sleeve having opposite tapered ends fitted to extend within said juxtaposed inner cylindrical surfaces for connecting said wheel hub and said inner joint member in torque-transmitting engagement; said sleeve means and said first and second tubular projections including cooperating formations for securing said tubular projections against relative axial displacement; first gear teeth provided at each of said opposite tapered ends of said sleeve; and second gear teeth formed at each of said wheel hub and said universal joint engaging respectively with said gear teeth on said opposite ends of said sleeve; with at least one of said tapered ends of said sleeve consisting essentially of a part of said sleeve which has been connected in said assembly by undergoing deformation.

2. An assembly according to claim 1 wherein said wheel hub and said universal joint each comprise internal conical face portions located in the regions of said first and second tubular projections, respectively, said internal conical face portions being located opposite said tapered ends of said sleeve, respectively, and flaring in a direction radially toward ends of said sleeve, said internal conical face portions each having teeth based in said conical face portions and engaging respectively with said teeth in said tapered ends of said sleeve.

3. An assembly according to claim 1 wherein said tapered ends of said sleeve are configured to flare radially outwardly of said sleeve in order thereby to engage at opposite ends of said sleeve said wheel hub and said universal joint thereby to prevent relative axial movement therebetween.

* * * * *